(12) United States Patent  
Miller

(10) Patent No.: US 9,353,496 B2  
(45) Date of Patent: May 31, 2016

(54) FLUID-FILLABLE BARRIER

(71) Applicant: Hydrological Solutions, Inc., Waller, TX (US)

(72) Inventor: Darren Andrew Miller, Cypress, TX (US)

( * ) Notice: Subject to any disclaimer, the term of this patent is extended or adjusted under 35 U.S.C. 154(b) by 0 days.

(21) Appl. No.: 14/839,990

(22) Filed: Aug. 30, 2015

(65) Prior Publication Data

US 2015/0368869 A1 Dec. 24, 2015

Related U.S. Application Data

(62) Division of application No. 14/189,637, filed on Feb. 25, 2014.

(51) Int. Cl.

| | |
|---|---|
| *E02B 3/04* | (2006.01) |
| *E02B 3/10* | (2006.01) |
| *B29C 65/02* | (2006.01) |
| *B29C 65/62* | (2006.01) |
| *B29C 65/72* | (2006.01) |
| *E02B 7/00* | (2006.01) |
| *B29C 65/10* | (2006.01) |
| *B29C 65/18* | (2006.01) |
| *B29C 65/50* | (2006.01) |
| *B29C 65/00* | (2006.01) |
| *B29C 65/04* | (2006.01) |

(52) U.S. Cl.
CPC ................ *E02B 3/108* (2013.01); *B29C 65/02* (2013.01); *B29C 65/62* (2013.01); *B29C 65/72* (2013.01); *E02B 3/04* (2013.01); *E02B 7/005* (2013.01); *B29C 65/04* (2013.01); *B29C 65/10* (2013.01); *B29C 65/18* (2013.01); *B29C 65/5042* (2013.01); *B29C 66/1122* (2013.01); *B29C 66/4344* (2013.01); *B29C 66/43441* (2013.01); *B29C 66/61* (2013.01)

(58) Field of Classification Search
CPC combination set(s) only.
See application file for complete search history.

(56) References Cited

U.S. PATENT DOCUMENTS

| | | |
|---|---|---|
| 4,299,514 A | 11/1981 | Muramatsu et al. |
| 4,692,060 A | 9/1987 | Jackson, III |
| 4,799,821 A | 1/1989 | Brodersen |
| 4,921,373 A | 5/1990 | Coffey |
| 4,966,491 A | 10/1990 | Sample |
| 4,981,392 A | 1/1991 | Taylor |
| 5,040,919 A | 8/1991 | Hendrix |
| 5,059,065 A | 10/1991 | Doolaege |
| 5,125,767 A | 6/1992 | Dooleage |
| 5,158,395 A | 10/1992 | Holmberg |
| 5,470,177 A | 11/1995 | Hughes |

(Continued)

*Primary Examiner* — Benjamin Fiorello  
*Assistant Examiner* — Kyle Armstrong  
(74) *Attorney, Agent, or Firm* — Tim Headley

(57) ABSTRACT

A fluid-fillable barrier which includes a flexible, tubular, impermeable membrane and at least two internal tension members. The membrane has opposite ends, a middle, fluid-fillable section, an upper attachment area, and a lower attachment area. The tension members secure between, and extend from, the upper attachment area to the lower attachment area. The tension members have a length which is less than one-half the perimeter of the membrane, the length and perimeter being measured at a common cross-section, taken perpendicular to a longitudinal axis of the membrane. One of the tension members is longer than the other, so that it is in a relaxed, limp state under normal operating conditions. The tension members are thermally bonded to, and sewn with a double sew line to, the attachment areas. The barrier further includes lifting loops at each end, connection cleats on the sides and ends, and venting/drainage standpipes.

2 Claims, 17 Drawing Sheets

(56) References Cited

U.S. PATENT DOCUMENTS

| | | | |
|---|---|---|---|
| 5,669,732 A * | 9/1997 | Truitt | E02B 3/127 405/18 |
| 5,865,564 A | 2/1999 | Miller et al. | |
| 6,126,362 A * | 10/2000 | Carter | E02B 3/108 405/114 |
| 6,481,928 B1 * | 11/2002 | Doolaege | E01D 15/20 138/98 |
| 6,641,329 B1 * | 11/2003 | Clement | E02B 3/108 405/115 |

* cited by examiner

FLUID-FILLABLE BARRIER

CROSS-REFERENCE TO RELATED APPLICATIONS

This is a divisional of pending application Ser. No. 14/189,637 (in art unit 3672), which is hereby incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The invention relates to a method or apparatus for regulating or redirecting the flow of a moving body of liquid, for regulating or modifying a fluid's movement through a path relating to a fixed artificial construction placed to obstruct the flow of a body of liquid so as to stop substantially all flow or to prevent lateral spreading of the body of liquid, wherein a portion of the barrier bends in response to forces exerted upon it by the obstructed stream.

(2) Description of Related Art (Including Information Disclosed Under 37 CFR 1.97 and 1.98)

U.S. Pat. No. 5,125,767 (the '767 patent) to Dooleage discloses a pair of flexible, impermeable bags 11 and 12, held together in a side-by-side relationship by a surrounding cover 13, such as another bag. Col. 2, lines 33-36. The system comprises a pair of elongate, flexible, and impermeable bags interlocked in a side-by-side relationship, and that may incorporate additional water-filled bags in the ends as anchors. Although simple in comparison to sheet piling methods, the cover 13 in the Dooleage design hides the inner bags 11 and 12. This makes it difficult to determine, prior to filling the bags, whether the bags 11 and 12 are properly aligned or whether they are tangled. In addition, utilizing three separate tubes increases the complexity and requires more material, thus increasing the weight of the design. The pair of bags 11 and 12 are "held together in side-by-side relationship by a surrounding cover 13". Column 2, lines 34-35. The system relies on a friction bond between the two tubes to prevent tube rotation: "the adjacent sides of the bags are in engagement and at the point of engagement will tend to rotate in opposite directions (in response to the tendency of the bags to roll) and to then become mutually locked and stable against rolling". Column 2, lines 51-55. Thus, it appears that in the Dooleage system, if one or more of the inner tubes fail, then the entire system fails.

U.S. Pat. No. 5,059,065 (the '065 patent) to Dooleage discloses in FIG. 9 a water structure section 31 which connects at its end 31a, in abutting engagement, with another water structure section 30. One end of the connecting sleeve 21 receives the water structure section end 31a, with the other connecting sleeve end arranged beneath the water structure section 30. On filling of the water structures and connecting of the sleeve plugs, the connecting sleeve 21 locks in place under the water structure section 30. Col. 6, line 66 through Col. 7, line 8.

U.S. Pat. No. 4,799,821 to Brodersen discloses an elongated flexible tube 12, which fills with water, and "joint packing material 16" "such as dirt" (Col. 4, line 46), placed at the junction of the water-filled tube and the ground surface 18. Col. 3, lines 10-19. However, the necessity of using the dirt increases the time which erection of the dike structure requires. Further, without the dirt, the dike structure would apparently tend to roll in the direction of the applied water pressure.

U.S. Pat. No. 5,040,919 to Hendrix discloses a containment device which includes an elongated, flexible tube 11 in the shape of an oblique angled triangle. Col. 2, lines 60-64. The triangular shape is maintained by gussets 14 of flexible material, attached by welding or adhesion to the inside of the tube 11. Arcuate cutouts 12 are placed at regular intervals along the inner circumference of the tube 11. Col. 2, lines 65 to Col. 3, line 5. However, the gussets 14 would apparently wrinkle when subjected to a transverse load. It would appear that wrinkling is minimized only when water completely fills the tube 11. Further, it appears that the walls of the tube 11 itself are fully placed in tension only when water completely fills the tube. Therefore, apparently, water must completely fill the tube 11 in order for the containment device to be fully effective.

U.S. Pat. No. 5,865,564 to Miller et al. discloses a water-filled bag 20 with a tension member 32. "The tension member 32 locks the barrier 20 against continued rotation." Column 4, lines 61-62. In FIG. 7, the Miller patent shows the barrier 20 having "two tension members 132 and 136". Column 5, line 42. However, the Miller patent shows the "tension" members 32, 132, and 136 always in "tension". Thus, the Miller design lacks any sort of a "back-up" system to account for the wear on the members 32, 132, and 136 from being constantly in tension. It has been determined that after many installation and removal cycles, the tension members can break, allowing the barrier 20 to roll.

What is needed is a fluid-fillable barrier which is simple, efficient, easily deployable and light weight, which provides a secure barrier at any filled height, which does not require shoring up or bracing in order to prevent movement or leakage, and which has a built-in backup ("safety") system to prevent the barrier from rolling, in the event that the tension members are compromised.

BRIEF SUMMARY OF THE INVENTION

The present invention solves the foregoing problems and achieves technical advantages with a fluid-fillable barrier which includes a flexible tubular, impermeable membrane and at least two internal tension members. The membrane has opposite ends, a middle, fluid-fillable section, an upper attachment area, and a lower attachment area. The tension members secure between, and extend from, the upper attachment area to the lower attachment area. The tension members have a length which is less than one-half the perimeter of the membrane, the length and perimeter being measured at a common cross-section, taken perpendicular to a longitudinal axis of the membrane. One of the tension members is longer than the other, so that it is in a relaxed, limp state under normal operating conditions.

In another feature, the tension member is a flexible, planar material having opposite edges which include corresponding upper and lower bonding areas. The upper and lower bonding areas bond to corresponding upper and lower attachment areas on the barrier.

In another feature, the tension members are thermally bonded to, and sewn with a double sew line to, the attachment areas.

In other features, the barrier further includes lifting loops at each end, venting/drainage standpipes, and cleats on the sides and ends of the barrier for connecting to other barriers, and for connecting to detachable slide-prevention devices.

In another feature, the barrier includes fittings for filling the barrier with a fluid and for draining the fluid from the barrier. The fittings have wide flanges which abut against opposite sides of a wall of the membrane. Fasteners fasten between the flanges, thus clamping the flanges together and capturing the wall of the membrane. This evenly distributes the stresses in the wall, and seals the fitting against leakage.

In another feature, the tubular membrane has opposite ends which a worker seals against fluid leakage in the following manner. Opposite sides of a perimetrical edge are brought together. The worker trims the edge to allow an overlap between opposite sides of the edge. The sides bond together at the overlap in a lap-seam.

In another feature, the barrier is part of a barrier assembly which includes at least one other barrier. The barrier assembly has at least two barriers which stack one upon another.

In another feature, the barrier bulges prior to delamination of the lap seams, thereby providing a visual warning of overfilling.

In another feature, a webbing connects adjacent barriers by strapping a webbing portion around the barriers, thus sealing against leakage between the barriers.

BRIEF DESCRIPTION OF THE SEVERAL VIEWS OF THE DRAWINGS

The novel features, characteristic of the invention, are set forth in the appended claims. However, the invention itself, as well as a preferred mode of use, and further objectives and advantages thereof, will best be understood by reference to the following detailed description, when read in conjunction with the accompanying drawings in which the left-most significant digit(s) in the reference numerals denote(s) the first figure in which the respective reference numerals appear.

DETAILED DESCRIPTION OF THE INVENTION

Figure 1:
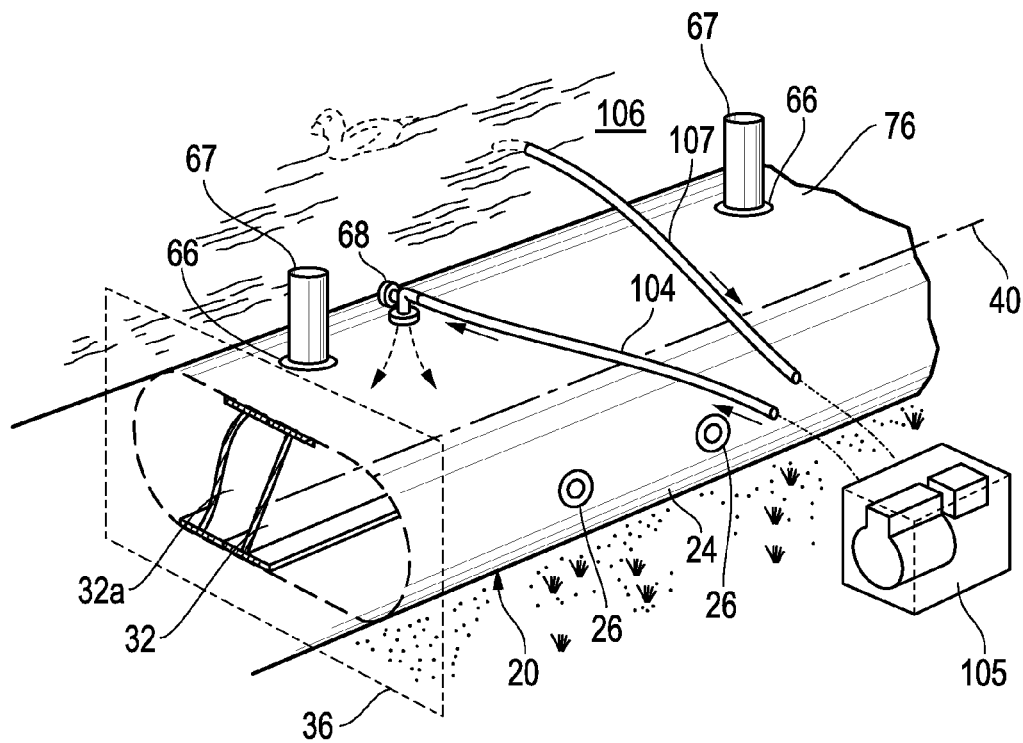
FIG. 1 is an isometric view of an illustrative water-fillable barrier.
Figure 6:
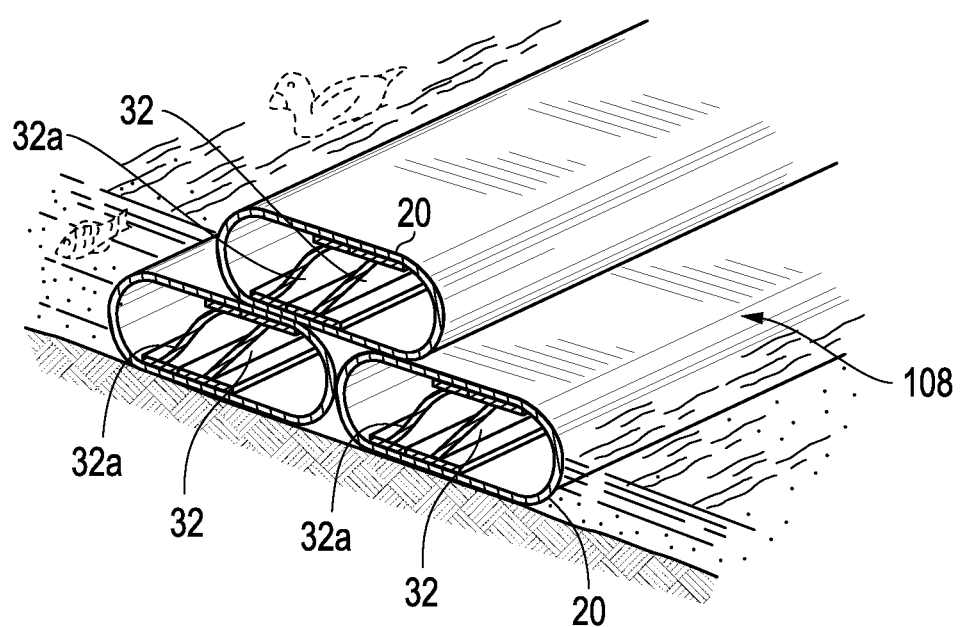
FIG. 6 is a cross-sectional view of a stack of the water-fillable barriers of FIG. 1.
Figure 13:
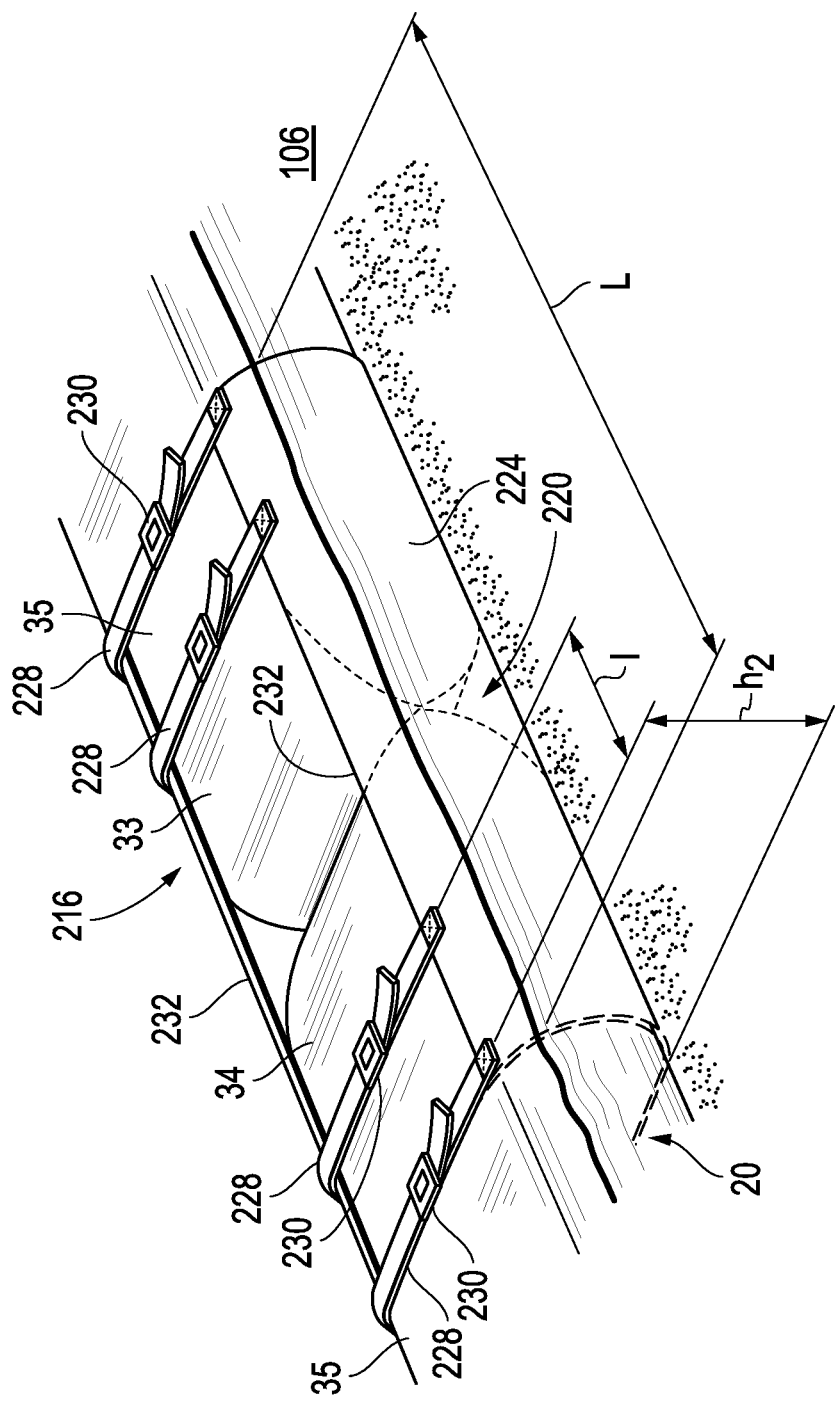
FIG. 13 is a perspective view of an end-to-end assembly of the invention.
Figure 14:
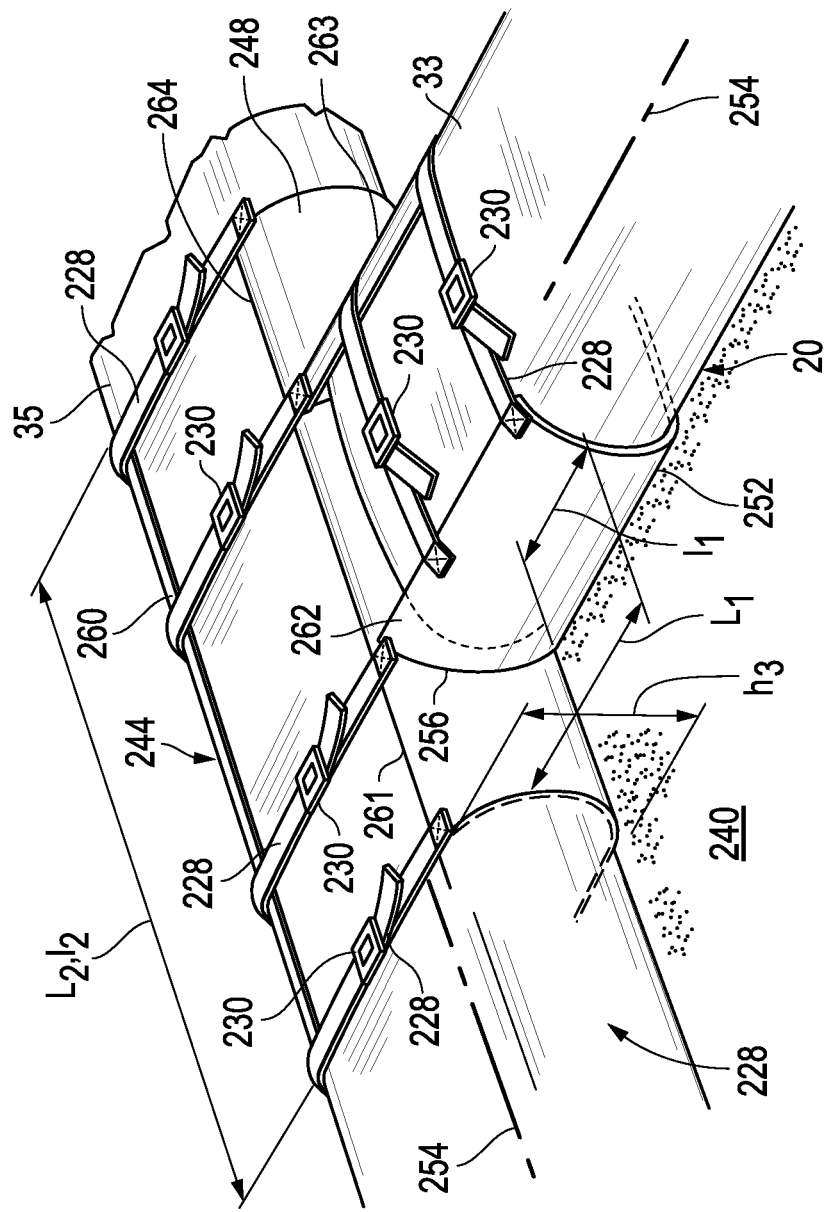
FIG. 14 is a perspective view of a "T" joint assembly of the invention.
Figure 15:
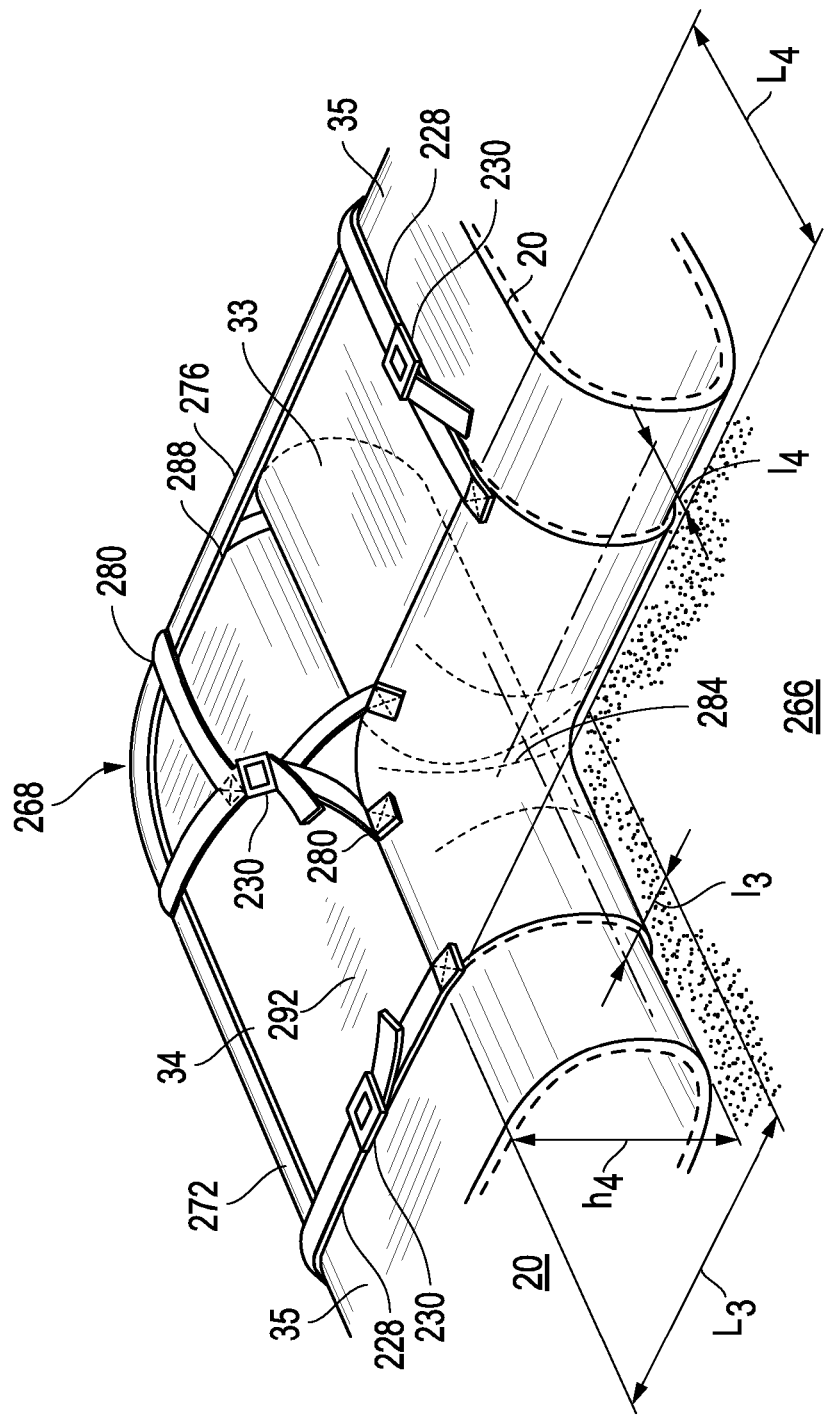
FIG. 15 is a perspective view of a "L" joint assembly of the invention.
Figure 16D:
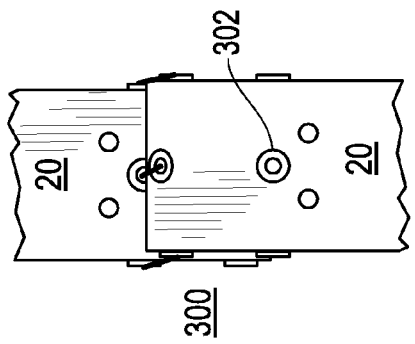
FIGS. 16A, 16B, 16C, and 16D are partial views of various connections of barriers, showing the use of cleats for the connections.
Figure 16A:
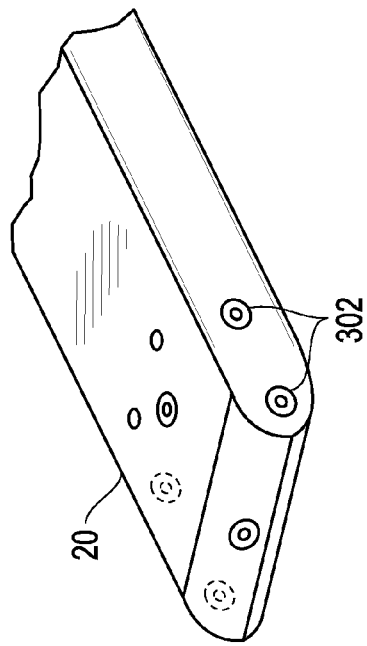
Figure 16C:
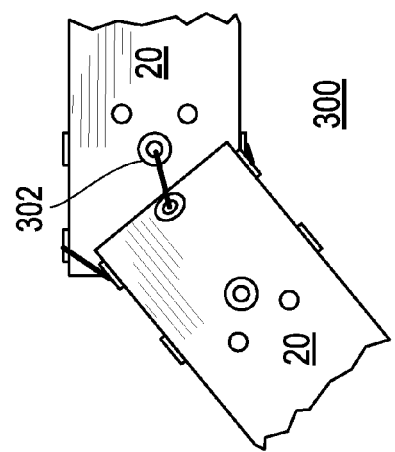
Figure 16B:
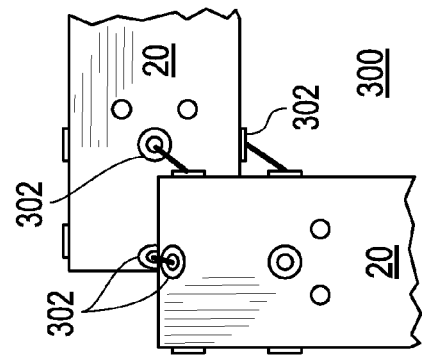
Figure 17A:
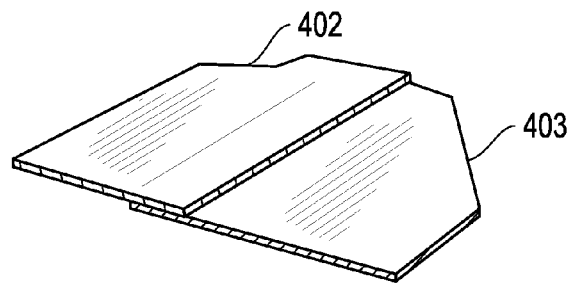
FIGS. 17A, 17B, 17C, and 17D illustrate seam connections when manufacturing the barrier, using a conventional sewing method.
Figure 17B:
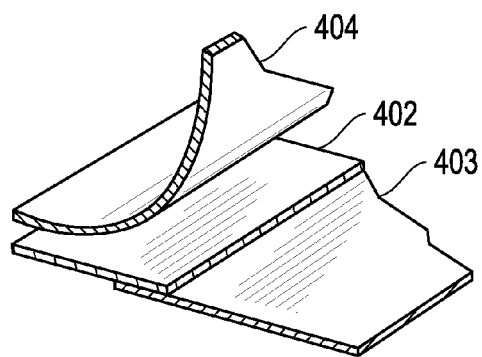
Figure 17C:
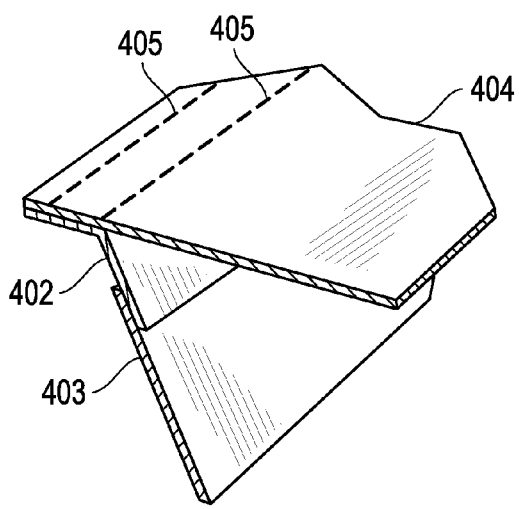
Figure 17D:
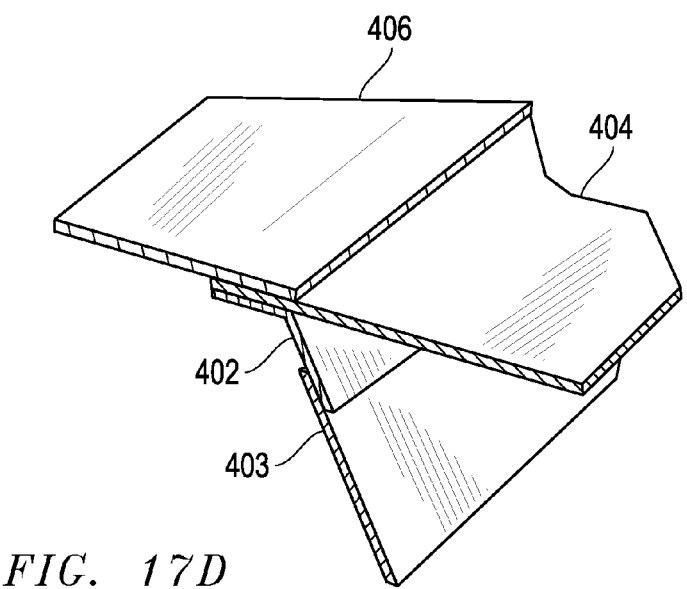

Referring to FIG. 1, a fluid-fillable barrier 20 includes a tubular, impermeable membrane 24, and tension members 32 and 32a. The membrane 24 and the tension members are fabricated from a 0.025 inch thick, flexible, woven polyester. A layer of flexible polyvinyl chloride coats the woven polyester. A cutting plane 36 indicates the location of the cross-section of FIG. 2. The cutting plane 36 is perpendicular to a central axis 40 of the membrane 24. Cleats 26 are thermally welded to the barrier 20 for connecting slide-prevention devices, such as landscape timbers, on the bottom of the barrier 20, to help prevent the barrier 20 from sliding, and are also used to connect a first barrier 20 to a second barrier 20 to form a barrier assembly 108, as shown in FIG. 6, a barrier assembly 216 as shown in FIG. 13, a barrier assembly 240 as shown in FIG. 14, a barrier assembly 266 as shown in FIG. 15, and a barrier assembly 300 as shown in FIGS. 16A, 16B, and 16C. In the preferred embodiment, the cleats 26 are located every ten feet.

Figure 2:
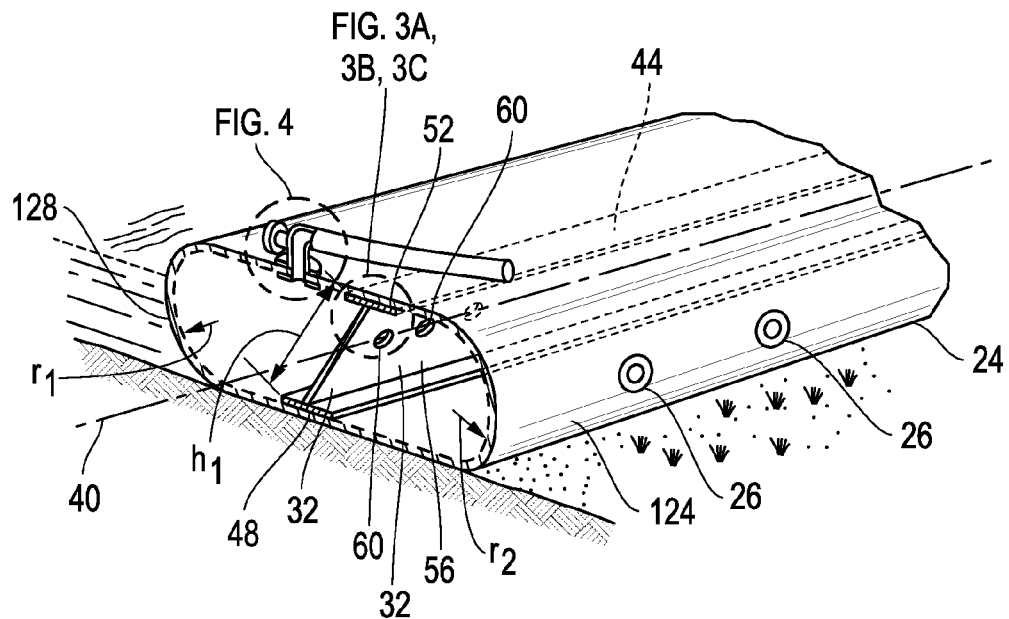
FIG. 2 is a isometric, cross-sectional view of the water-fillable barrier of FIG. 1, cut by the plane which reference numeral 36 in FIG. 1 indicates.

Referring now to FIG. 2, the membrane 24 has upper and lower attachment areas 44 and 48, which extend along a dimension parallel to the central axis 40 of the membrane 24. The tension members 32, 32a are planar and have opposite ends 52 and 56 which include corresponding upper and lower bonding areas (e.g., 43, shown in FIG. 3A). The tension members 32, 32a have openings 60 through which a fluid may pass, thus permitting the filling of the barrier 20 across the tension member. The tension member 32 has a maximum taut length h1 which is less than a laid-flat, empty width of the membrane 24, the length and the width being measured at a common cross-section. The cross-section is taken perpendicular to the central axis 40 of the membrane 24. The tension members 32, 32a secure between, and extend from, the upper attachment area 44 to the lower attachment area 48. The second tension member 32a (not shown in FIG. 2) has a maximum taut length h2, which is greater than the maximum taut length h1, so that under normal operating conditions, the tension member 32a is limp. In the preferred embodiments, the length h2 is between one inch greater and 25% greater than the length h1. In the most preferred embodiment, the length h2 is 16% greater than the length h1. The upper and lower bonding areas bond to corresponding upper and lower attachment areas 44 and 48.

Figure 3A:
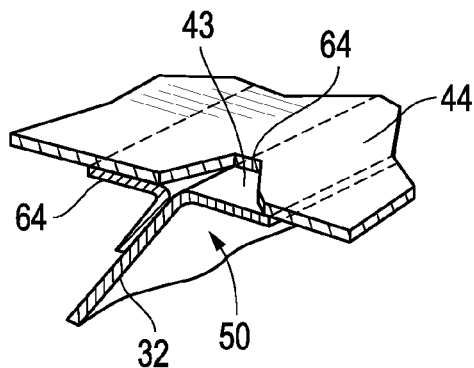
FIG. 3A is a partial cut-away, close up view of the region which reference numeral 3a in FIG. 2 indicates.

Referring now to FIGS. 2 and 3A, the bonding area 43 bonds to the corresponding upper attachment area 44 in a double lap-seam 50, along a bonding interface 64. The bonding is a thermal fusion bonding. Hot air welding fuses the bonding area 43 to the upper attachment area 44, thus creating bonding interfaces 64. During hot air welding, the bonding area 43 and the corresponding attachment area 44 pass between two rollers (not shown). Just prior to the bonding area 43 and the corresponding attachment area 44 entering between the rollers, a jet of hot air heats the bonding interface 64. This softens the bonding area 43 and the attachment area 44, in preparation for a bond. The combination of the double-lap seam 50, the bonding area 43, the attachment area 44, and the bonding interfaces 64 form a "T-seam" 65. See also FIG. 3B, which shows that the double lap-seam 50 provides a substantially triangular gap 112 between the membrane 24 and the tension members 32 and 32a. In a preferred embodiment, additionally, the bonding area 43 and the corresponding attachment area 44 are also connected via an industrially-sewn thread line. The thread is a Kevlar filament thread that has a breaking strength of forty-five pounds. The thread line is made of four lock stitches per inch, thus resulting in 180 pounds breaking strength per inch. The maximum internal stress that the barrier assemblies 108, 216, 240, 266, and 300 receive (when stacked to be eight feet in height) is eighty-nine pounds. Thus, the 180 pound-thread-breaking-strength results in a safety factor of two. This thread line is a "stop gap" measure which prevents the critical triangle of the T-seam 65 from delaminating.

Referring now to FIG. 1, the barrier 20 includes fittings 66 with standpipes 67 placed along the top of the barrier 20, to be used for air venting and protection against overinflating. The preferred type of fittings 66 for a barrier 20 that is one to four feet in height are two-inch internal diameter, made of threaded polyethylene. The top female fitting is threaded onto the bottom male fitting with the barrier outer membrane in between. The fittings 66 are part number 502, made by "Custom Plastics", located at 1305 West Brooks Street, Ontario, Calif. 91762. The preferred type of fittings 66 for barriers five to eight feet in height are four-inch internal diameter threaded polyethylene, all plastic injection molding, made by the All Plastics company, located at 15700 Midway, Addison, Tex. 75001. The top and bottom flange are bolted onto the outer membrane using stainless steel bolts.

The standpipes 67 are made of standard schedule 40 pvc pipe. The standpipe 67 lengths vary depending on the height of the barrier 20. The lengths correspond to the head pressure that is required to fully inflate the barrier 20 to its recommended height. The table below shows the recommended lengths:

| Barrier height in feet | Standpipe length in inches |
|---|---|
| 1 | 2 |
| 2 | 4 |
| 3 | 5 |

-continued

| Barrier height in feet | Standpipe length in inches |
|---|---|
| 4 | 7 |
| 5 | 9 |
| 6 | 11 |
| 7 | 12 |
| 8 | 15 |

Figure 4:
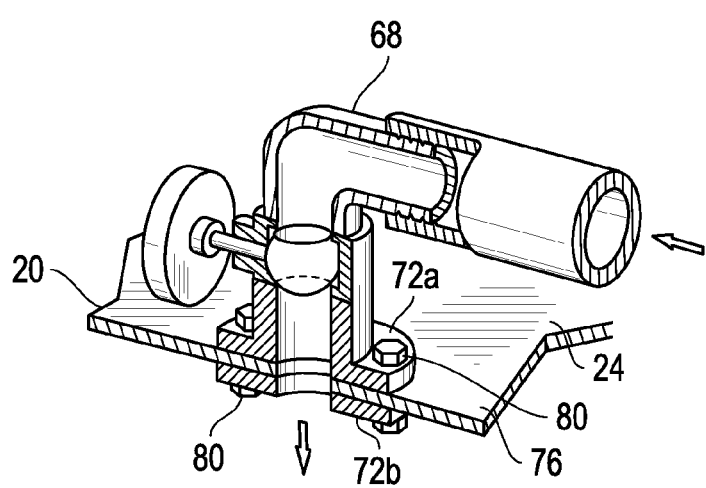
FIG. 4 is a close up, cross-sectional view of the region which reference numeral 4 in FIG. 1 indicates.

Referring now to FIG. 4, the barrier 20 also includes fittings 68 for filling the barrier with a fluid and draining the fluid from the barrier. The fittings 68 have wide flanges 72a and 72b, which abut against opposite sides of a wall 76 of the membrane 24. Fasteners 80 fasten between the flanges 72a and 72b, thus clamping the flanges together and capturing the wall 76 of the membrane 24. This evenly distributes the stresses in the wall 76, and seals the fitting 68 against leakage.

Figure 5A:
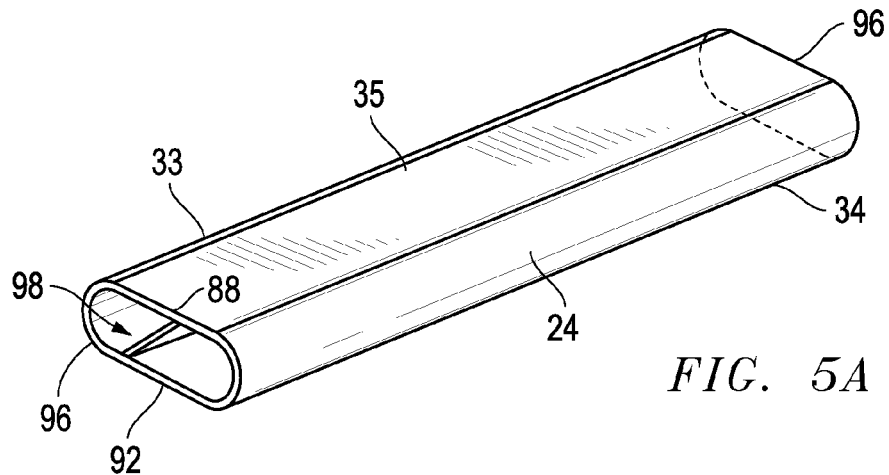
FIG. 5A is an isometric view of the water-fillable barrier of FIG. 1.
Figure 5B:
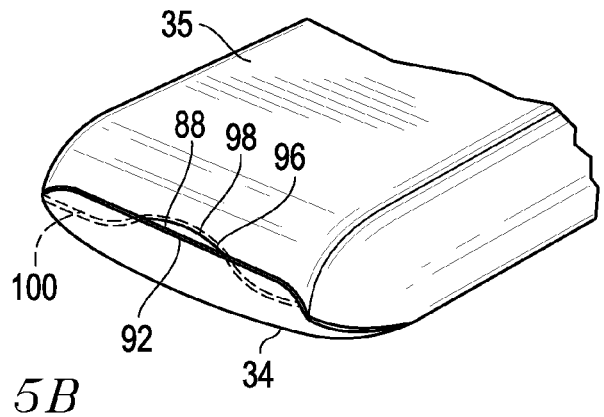
FIG. 5B is a perspective view of an end of the water-fillable barrier of FIG. 1.

Referring now to FIGS. 5A and 5B, the membrane 24 has opposite ends 33 and 34, each having a perimetrical edge 96 defining an opening 98. A worker seals the opposite ends 33 and 34 against fluid leakage in the following manner. Opposite sides 88 and 92 of a perimetrical edge 96 are brought together. The worker trims the edge 96 to allow an overlap 100 between opposite sides 88 and 92. The sides 88 and 92 bond together at the overlap 100 in a lap-seam.

Figure 5C:
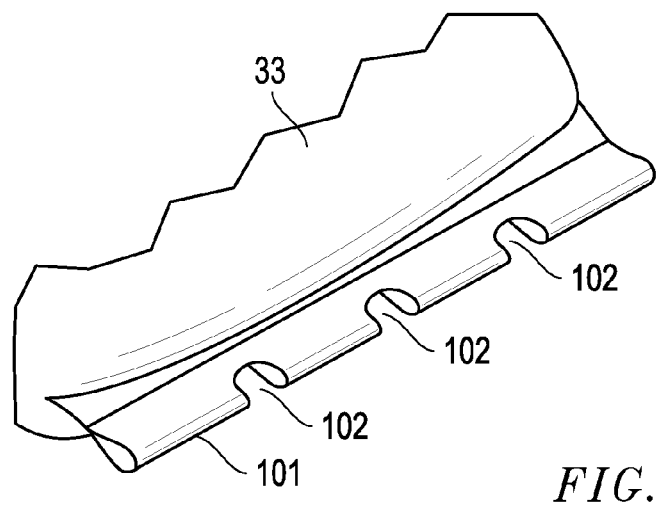
FIG. 5C is a perspective view of an end of the water-fillable barrier of FIG. 1, showing a lifting loop.

Referring now to FIG. 5C, after bonding the ends 33 and 34, a lifting loop 101 is bonded or sewn to each end 33 and 34, but in the preferred embodiment, it is heat sealed to each end 33 and 34. The lifting loop 101 is sized to accommodate up to a three-inch internal diameter, schedule 40 steel pipe that can be slid into either end of the lifting loop 101. The lifting loop 101 contains a minimum of three cut-outs 102 for the smaller barriers, but contains more for the larger barriers.

In operation, up to a three-inch internal diameter, schedule 40 steel spreader pipe 109 (shown in FIG. 5D) is slid into either end of the lifting loop 101. Next, an additional schedule 40 steel spreader pipe 109, up to a three-inch internal diameter, is connected parallel to the schedule 40 steel spreader pipe 109 that is inside the lifting loop 101 by using at least five pieces of nylon rope, preferably ¾ inch by six feet long, one at each end of the schedule 40 steel spreader pipe 109, and one through each cut-out 102. Next, the operator attaches three ¾ inch by fifteen feet nylon ropes to only the three-inch diameter outside spreader pipe 109, at the locations of the cut-outs 102, and then connects those three nylon ropes to a hoisting apparatus 103 (shown in FIG. 5D).

Once the barrier 20 is manufactured, a worker stores the barrier 20 empty. The worker may either roll up or fan-fold the barrier 20 in preparation for storage, depending on the requirements of the anticipated use. In operation, when deploying the barrier 20 from a stored configuration on dry land, the barrier 20 is advantageously stored in a rolled condition. This minimizes abrasion of the barrier 20 against the ground during deployment.

Figure 5D:
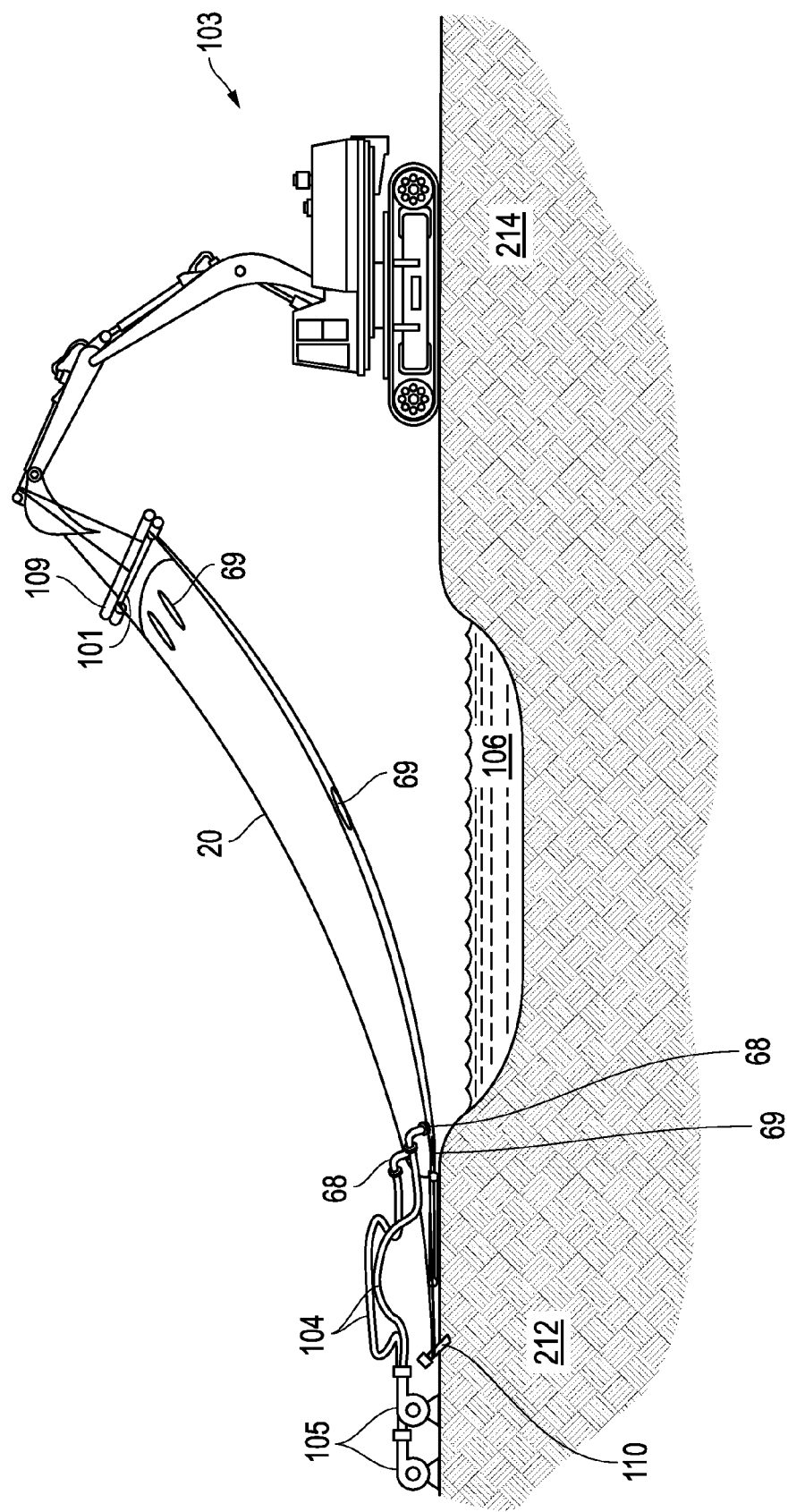
FIGS. 5D, 5E, and 5F illustrate the preferred method of installing the water-fillable barrier in moving water.
Figure 5E:
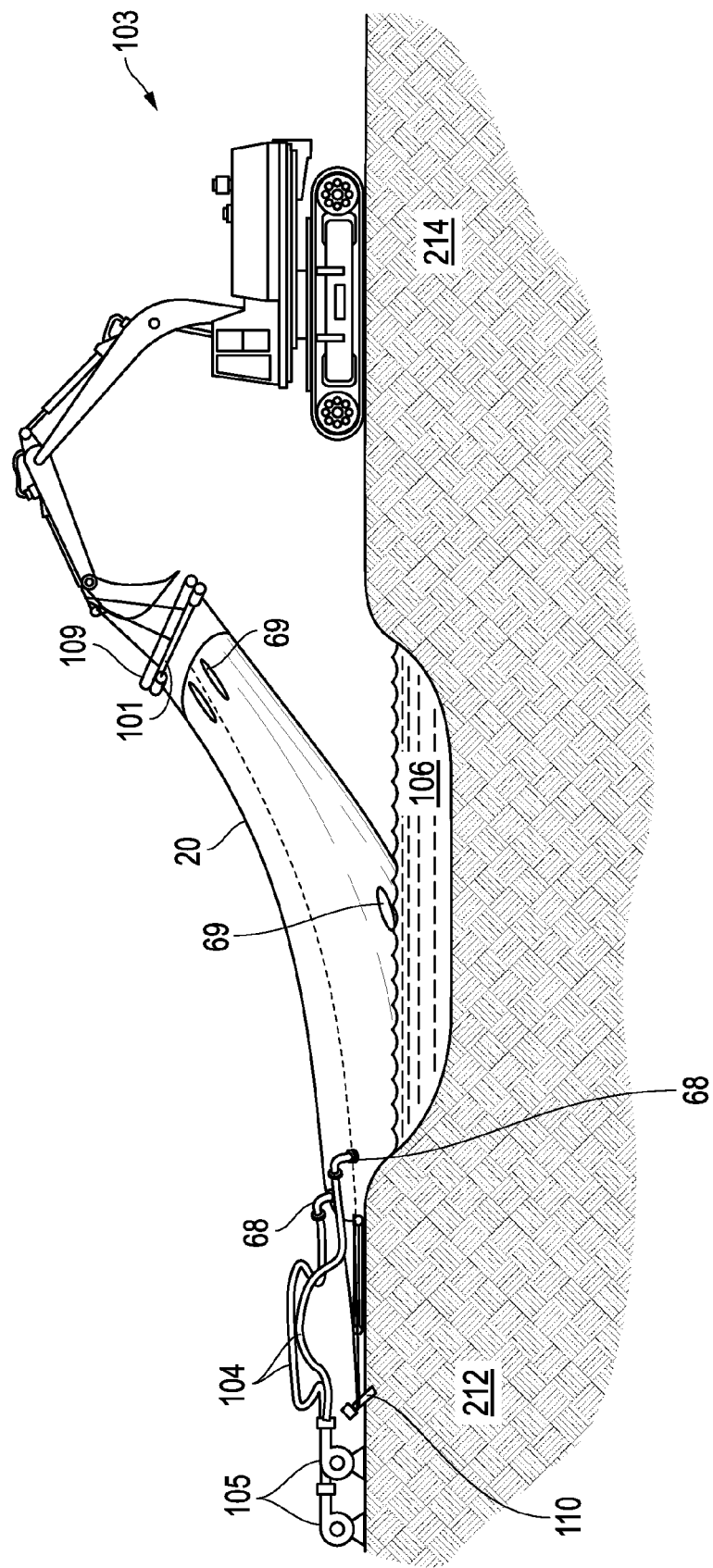
Figure 5F:
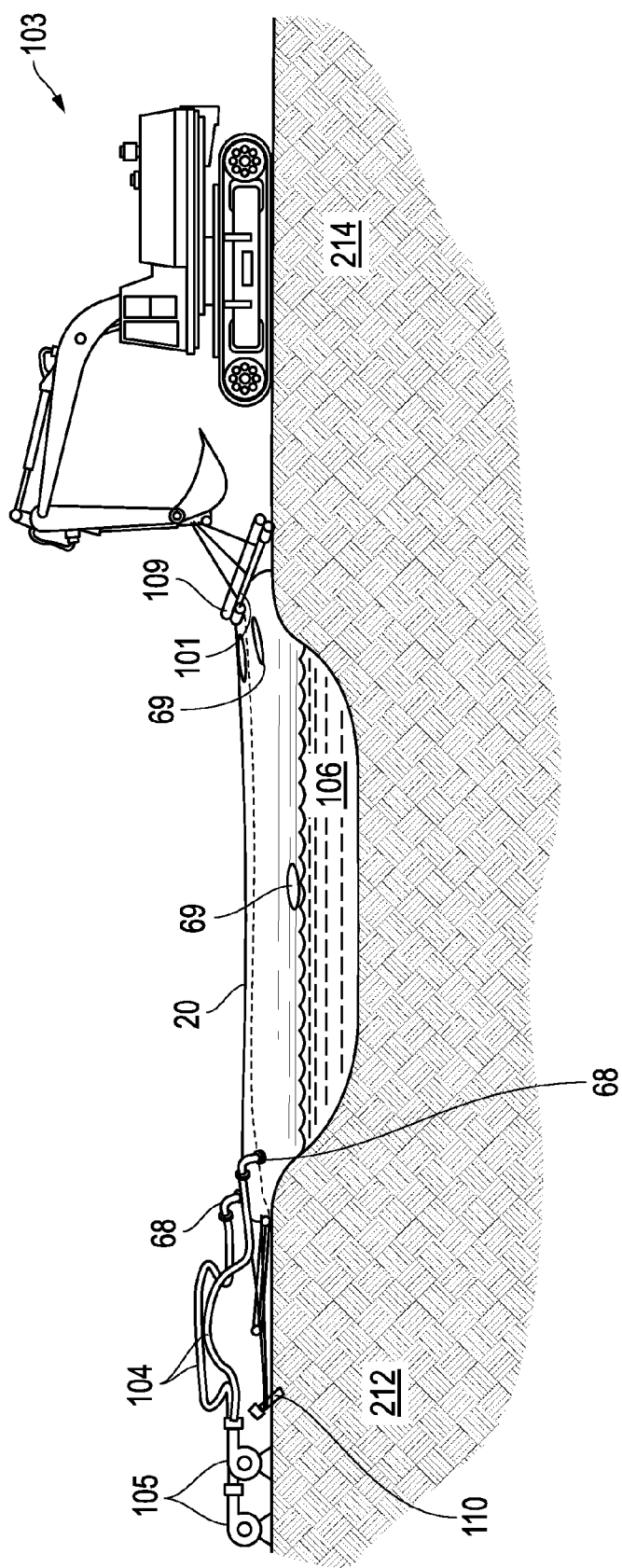

Referring now to FIG. 5D, in installations in which dynamic flowing water 106 is present, at one end of the barrier 20, the lifting loop 101 is accessed, the spreader pipes 109 are connected, and all are connected to a hoisting apparatus 103. Similarly, at the other end of the barrier 20, the lifting loops 101 and spreader pipes 109 are connected to a shoreline anchor point 110. In an alternate method of operation, the shoreline anchor point 110 can be replaced with a second hoisting apparatus 103. The barrier 20 is suspended above the body of water 106 utilizing the lifting loop 101 while inflation takes place using the pumps 105, fill lines 104, and fittings 68. Partial inflation is shown in FIG. 5E, and full inflation is shown in FIG. 5F. The weight of the filled portion of the barrier 20 helps anchor the barrier 20 during deployment across the moving water 106, provided that the head of water in the barrier exceeds the head of the moving water, and the weight generates sufficient friction with the floor to resist the hydrodynamic pressure which the moving water imposes. The reverse of this process can be used to remove the barrier 20. When reversing the process, water in the barrier 20 is allowed to drain out through drain ports 69. For a barrier 20 that is five feet high, and one hundred feet long, the barrier 20 has a drain port 69 centered on each longitudinal side, and one drain port 69 on each end 33, 34. Each drain port 69 comprises an eight inch ABS plastic threaded plug with a standard U.S. thread, with a lip that is ¼ inch thick, and extends ¾ of an inch from the thread line. A ¾ inch wide, ⅛ thick neoprene reinforced with nylon gasket is installed outside the thread line, and rests under the lip. When the plug is threaded into position, the lip-gasket combination acts to prevent leaking that would otherwise occur from the flange thread—plug thread connection. The plugs are manufactured by the All Plastics Company, located at 15700 Midway, Addison, Tex. 75001.

In a situation in which there is standing water across which the barrier 20 must span, a worker may pull the barrier, which a worker had stored in a fan-folded condition, across the water from an embankment 212 or 214 (shown in FIG. 12) opposite the deployment point. This enables rapid deployment of the barrier 20. The worker may then fill the barrier 20 after deployment.

Unless a worker fills the barrier 20 concurrently with water during deployment, or uses a barrier whose ends 33 or 34 (shown in FIG. 5a) are sealed, the worker must prepare the ends such that water will not leak out from the ends, according to the embodiments described above.

Referring again to FIGS. 1 and 2, in operation, after the ends 33 and 34 (shown in FIG. 5a) are sealed, a worker attaches a water fill line 104 from a pump 105 to the fitting 68. The worker attaches a suction line 107 from a water source into the barrier 20 to the pump 105. The worker then pumps water 106 from the water source into the barrier 20. When the wall 76 of the barrier 20 begins to bulge along the double lap seam 50 (shown in FIG. 3B), then the barrier is full. When a net pressure applies to the side 124 and/or 128, the barrier 20 begins to roll in the direction of the net pressure. The net pressure is the difference between the hydrodynamic and/or hydrostatic pressure which a water head applies to the sides 124 and 128. The tension member 32 locks the barrier 20 against continued rotation which the net pressure induces, regardless of the barrier's filled height, thus providing a secure barrier which does not require shoring up or bracing in order to prevent further movement, and which, after the locking, is effective as a barrier at any point of filling, up to the maximum filled height of the barrier. The barrier 20 locks because, as the membrane 24 fills with water, and the net pressure causes the barrier to roll, the tension member 32 ultimately extends to its maximum taut length h1. Because the tension member 32 can stretch no further, and because further stretching is necessary in order for the tension member to continue around end radii "r1" and "r2" of the membrane 24 without deforming the shape of the membrane (which itself is fully in tension), the barrier 20 stops rolling and locks in place. The tension member 32a serves as a "backup" to tension member 32, in case tension member 32 breaks. If the tension member 32 breaks, then the tension member 32a will operate in the same manner that the tension member 32 had been operating.

Referring now to FIG. 6, the barrier 20 may be part of a barrier assembly 108 which includes at least one other barrier. The barrier assembly 108 may have two or more barriers 20 which stack one upon another, in a pyramid fashion. This enables the control or damming of heads of water which exceed the height of a single barrier 20.

Figure 3B:
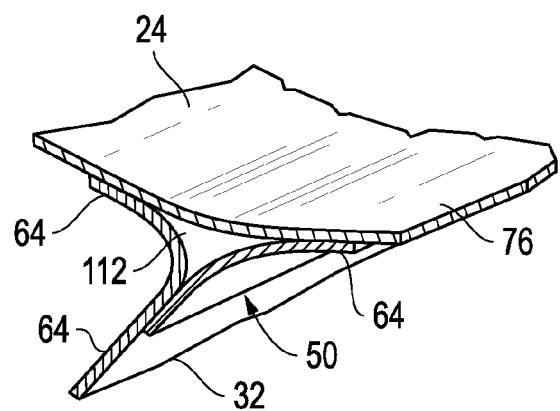
FIG. 3B is a close up view of another embodiment showing the region which reference numeral 3b in FIG. 2 indicates.

Referring now to FIG. 3B, in another embodiment, the double lap-seam 50 provides a substantially triangular gap 112 between the membrane 24 and the tension members 32 and 32a.

Figure 3C:
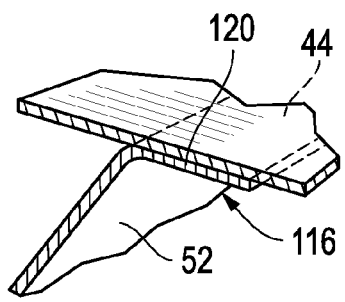
FIG. 3C is a close up view of another embodiment showing the region which reference numeral 3c in FIG. 2 indicates.

Referring now to FIGS. 2 and 3C, in another, simplified embodiment, two bonding areas, one along each end 52 and 56, and on opposite sides of the tension members 32, 32a, bond to corresponding attachment areas 44 and 48 in a single lap-seam 116 along a bonding interface 120. Bonding on opposite sides of the tension members 32, 32a ensures that the bonding areas will not be subject to a high peeling force when a control fluid (the fluid which the barrier 20 shall control, contain, or divert) applies a net hydrodynamic and/or hydrostatic pressure to the side 128 of the barrier 20. However, in this embodiment, any net pressure which applies against the opposite side 124 would cause the barrier 20 to roll until the tension member locks the barrier against further motion. The tension in the tension member 32 would then apply a force to both lap-seams 116 which would tend to peel the lap-seams from their respective attachment areas 44 and 48, ultimately resulting in delamination and failure of the lap-seams. Therefore, although this embodiment is simple, it is effective only when the net pressure applies in a certain direction (in this case, side 128).

Figure 7:
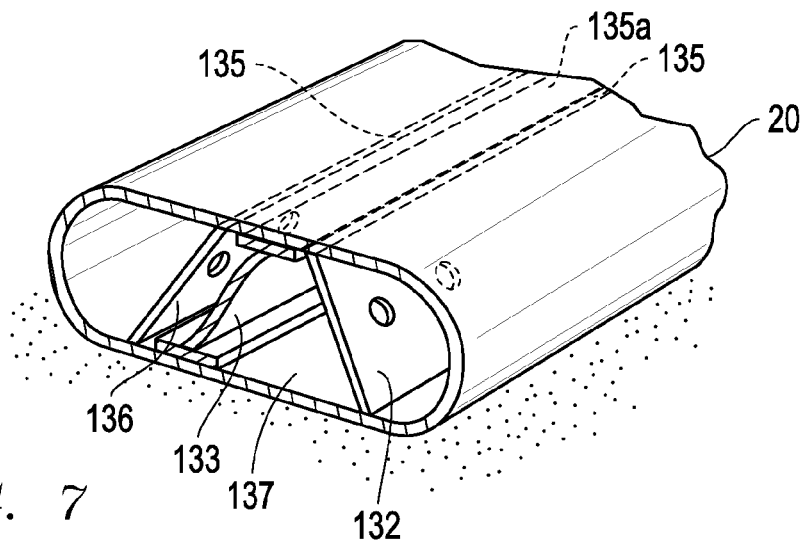
FIG. 7 is an isometric, cross-sectional view of another embodiment of the invention.

Referring now to FIG. 7, in another embodiment, the barrier 20 has at least two tension members 132 and 136 which lie in non-parallel planes. The tension member 132 inclines toward another tension member 136, thus forming a cell 137 between them which does not have the shape of a parallelogram. This arrangement minimizes the free lateral movement of the barrier 20, prior to the barrier locking in place. A third tension member 133 acts as a backup to the tension members 132 and 136, in the same way that tension member 32a works as a backup to tension member 32.

Color coded strips 135 on the top of the barrier 20, above the attachment sections where members 132 and 136 attach, indicate that members 132 and 136 are in tension during normal operation. Color coded strip 135a, above the attachment section where member 133 attaches, is made of a different color than strips 135, thus indicating to the casual observer that, under normal operating conditions, member 133 is not in tension.

In another embodiment (not shown), the tension members 132 and 136 may lie in parallel planes.

Figure 8:
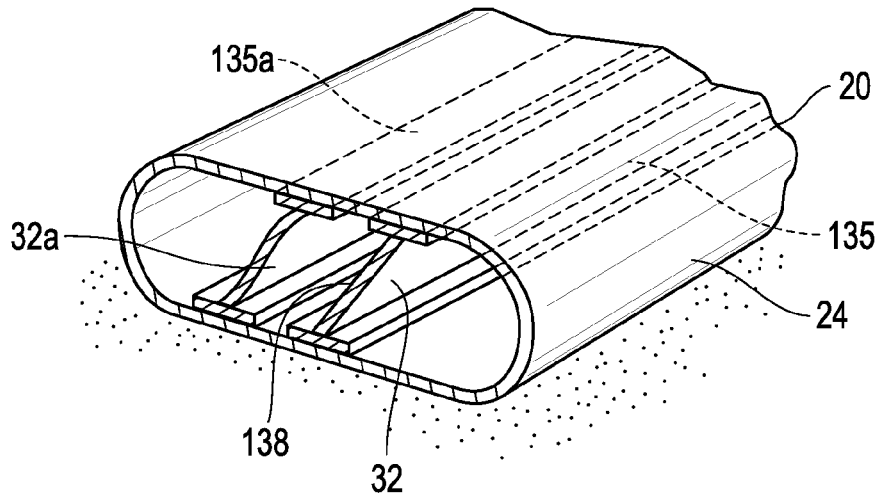
FIG. 8 is an isometric, cross-sectional view of another embodiment of the invention.

Referring now to FIG. 8, in another embodiment, the tension members 32, 32a are made of a netting material 138. Similarly, in another embodiment, not shown, the tension members 132, 133, and 136 are made of a netting material 138. Just as in the embodiment of FIG. 7, a color coded strip 135 on the top of the barrier 20, above the attachment section where member 32 attaches, indicates that member 32 is in tension during normal operation. Color coded strip 135a, above the attachment section where member 32a attaches, is made of a different color than strip 135, thus indicating to the casual observer that, under normal operating conditions, member 32a is not in tension.

Figure 9:
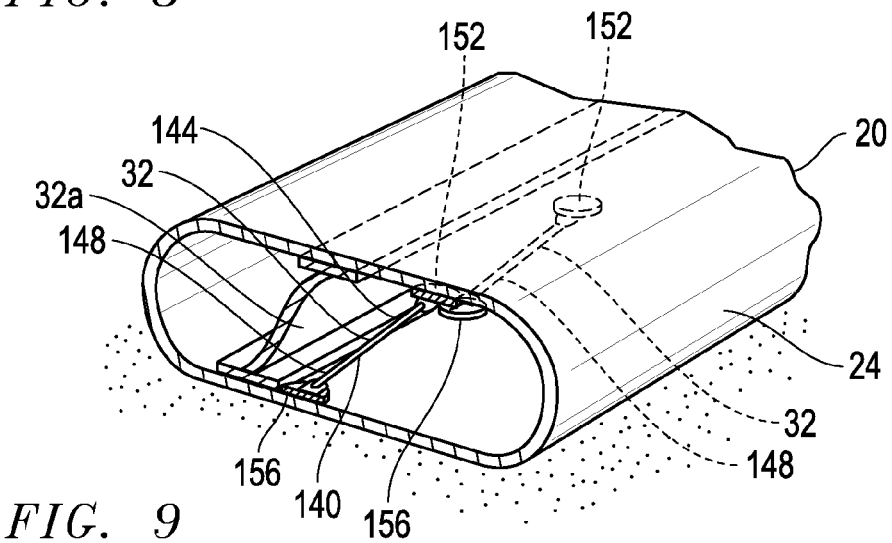
FIG. 9 is an isometric, cross-sectional view of another embodiment of the invention.

Referring now to FIG. 9, in another embodiment, the tension members 32, 32a are straps or cables 140. The strap 140 has upper and lower ends 144 and 148, which bond or otherwise attach to corresponding attachment areas 152 and 156 of the membrane 24.

Figure 10:
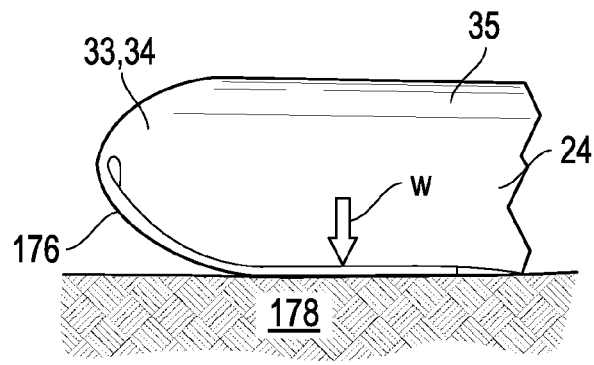
FIG. 10 is a partial side view of another embodiment of an end of the invention.

Referring now to FIGS. 5a and 10, in another embodiment, a worker seals the opposite ends 33 and 34 against fluid leakage by bringing opposite sides 88 and 92 of each edge 96 together, and folding a length of each end underneath the middle, fluid-fillable section 35. This defines a folded over portion 176. The worker then fills the barrier 20 with a fluid such that the weight of the fluid, indicated by the arrow, "w", against the folded over portion 176 and the ground 178, seals each end 33 and 34.

Figure 11:
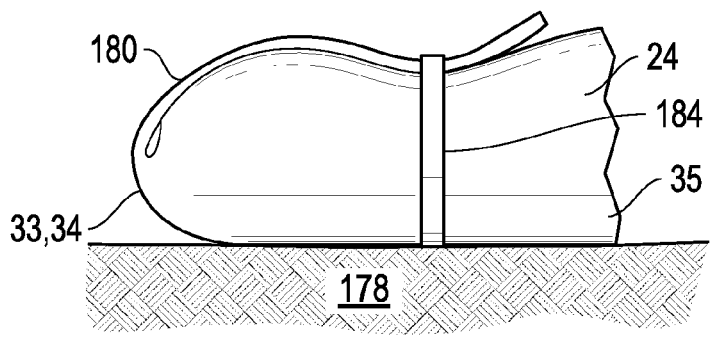
FIG. 11 is a partial side view of another embodiment of an end of the invention.

Referring now to FIGS. 5a and 11, in another embodiment, the ends 33 and 34 seal against fluid leakage by closing each edge 96 of the membrane 24, folding over a length of each end back over the middle, fluid-fillable section 35, thus defining a folded over portion 180, tucking a length of the folded over portion under a closed strap 184 having a predetermined perimetrical length, and filling the barrier 20 with a fluid such that the strap applies pressure against the folded over portion, thus sealing the end.

Figure 12:
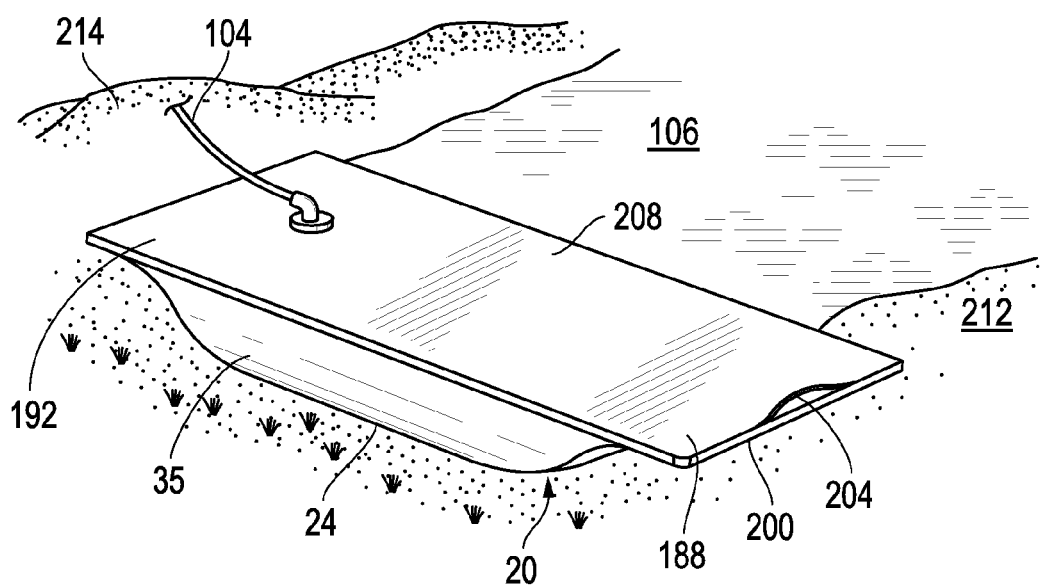
FIG. 12 is a perspective view of another embodiment of the invention.

Referring now to FIG. 12, in another embodiment, the membrane 24 has opposite ends 188 and 192, and a middle, fluid-fillable section 35. The opposite ends 188 and 192 each have a perimetrical edge 200 defining an opening 204. A worker elevates the opening 204 to a height which is higher than a height which the fluid-fillable section 35 attains when filled with fluid, thus preventing fluid leakage from the elevated end 188 or 192. Embankments 212 and 214, for example, may conveniently serve to elevate the ends 188 and 192.

Referring now to FIG. 13, in another embodiment, the barrier 20 is part of a barrier assembly 216 in which a webbing 220 joins at least two barriers end-to-end. The webbing 220 is tailored to join the barriers 20 at a 180 degree. angle, although the webbing may optionally be tailored to join the barriers 20 at any angle. The webbing 220 straps around the adjacent ends 33 and 34 of the barriers 20. The webbing 220 includes a webbing portion 224 and straps 228 with adjustable connectors or buckles 230. The webbing portion 224 has a length, "L", sufficient to overlap an area of the middle, fluid-fillable section 35 near each of the adjacent ends 33 and 34. The overlap has a length, "l", sufficient to seal against fluid pressure, and a width sufficient to wrap around each adjacent barrier 20 to a height, "h2", which is higher than an anticipated depth of the water 106 to be controlled, contained, or diverted. This prevents excessive flow of fluid past the webbing portion 224. The straps 228 connect to an edge 232 of the webbing portion 224. The adjustable buckles 230 adjustably connect corresponding straps 228 together around the barriers 20. The straps 228 draw tightly around each barrier 20, thus sealing the webbing 220 against the barriers 20.

Now referring to FIG. 14, in another embodiment, the barrier 20 is part of a barrier assembly 240 in which a webbing 244 joins two barriers, one barrier being joined by its end 33, and the other along its middle, fluid-fillable section 35. The webbing 244 includes two webbing portions 248 and 252, and straps 228 with adjustable buckles 230. The webbing portions 248 and 252 are each tailored to cradle one of the adjacent barriers 20, wrapping around the middle, fluid-fillable section 35 of one of the barriers and an end 33 of another barrier, including a portion of the fluid-fillable section 35 of this barrier, in a "T" joint. Nevertheless, the webbing 244 may optionally be tailored to join the barriers 20 at a wide range of angles. The webbing portions 248 and 252 have lengths, "L1" and "L2", defined parallel to an axis 254 of the barrier 20 around which each wraps, sufficient to overlap an area of the middle, fluid-fillable section 35 of each of the adjacent barriers. The overlap has a length, "l1" and "l2", sufficient to seal against excessive fluid flow, and a width sufficient to wrap around each adjacent barrier 20 to a height, "h3", which is higher than the anticipated depth of water to be controlled, contained, or diverted. This prevents excessive flow of fluid past the webbing 244. The webbing portions 248 and 252 connect together at a seam 256 to form the unbroken, sealed webbing 244 between adjacent barriers 20. The straps 228 connect to edges 260, 261, 262, 263, and 264 of the webbing portions 248 and 252. The adjustable buckles 230 adjustably connect corresponding straps 228 together around the barriers 20. The straps 228 draw tightly around each barrier 20, thus sealing the webbing 244 against the barriers.

Now referring to FIG. 15, in another embodiment, the barrier 20 is part of a barrier assembly 266 in which a webbing 268 joins the ends 33 and 34 of two barriers. The webbing 268 includes two webbing portions 272 and 276, and straps 228 and 280 with adjustable buckles 230. The webbing portions 272 and 276 are each tailored to cradle the ends 33 and 34 of the adjacent barriers 20, wrapping around a portion of the middle, fluid-fillable sections 35 of each of the barriers, in a "L" joint. Nevertheless, the webbing may optionally be tailored to join the barriers 20 at a wide range of angles. The webbing portions 272 and 276 have lengths, "L3" and "L4", defined parallel to an axis of the barrier 20 around which each wraps, sufficient to overlap a portion of the middle fluid-fillable section 35 of each of the adjacent barriers. The overlap has a length, "l3" and "l4", sufficient to seal against excessive fluid flow, and a width sufficient to wrap around each adjacent barrier 20 to a height, "h4", which is higher than the anticipated depth of water to be controlled, contained, or diverted. This prevents excessive flow of fluid past the webbing 268. The webbing portions 272 and 276 connect together along a seam 284 to form an unbroken, sealed webbing 268 between adjacent barriers 20. The straps 228 and 280 connect to edges 288 and 292 of each webbing portion 272 and 276. The adjustable buckles 230 adjustably connect corresponding straps 228 and 280 together around the barriers 20. The straps 228 and 280 draw tightly around each barrier 20, thus sealing the webbing 268 against the barriers.

Referring now to FIG. 16a, in another embodiment, the barrier 20 is part of a barrier assembly 300 in which end cleats 302 are used to join the ends 33 and 34 of two barriers. The end cleats 302 are loops that are eight inches in diameter, and are produced from thirty-five ounce, number 2000 denier, vinyl-coated polyester, with a two-inch wide seatbelt industrial strength webbing. The cleats are connected to each other by rope, webbing, a bungee cord, or any similar soft device. The locations of the cleats 302 depend on the height of the barrier 20, and the required overlap. As an example, an eight-foot-high barrier uses a twelve foot overlap so that the three cleats 302 on the barrier 20 are located twelve feet from the end, one on each side, and one just off the top center baffle line. Also, there are three cleats 302 on the end of the barrier 20: one on each side, and one in the middle. Thus, the end cleats 302 are located on the sides, top, and end of the barrier 20. Referring now to FIG. 16b, two barriers 20 are joined together at a right angle. Preferably, ¾ inch thick nylon rope is used to connect the cleats of the two barriers. Referring now to FIG. 16c, two barriers 20 are joined together at a 45 degree angle, using the end cleats 302 and nylon rope. Referring now to FIG. 16d, two barriers 20 are joined together by having an end of a first barrier overlapping an end of a second barrier, using the end cleats 302 and nylon rope.

For any of the embodiments shown, a slide prevention membrane is available to completely encapsulate the barrier, or can be attached to only the bottom of the barrier, as the user desires. The membrane has fabricated loops, straps, etc. for attaching landscape timbers or other protruding devices to create points of friction for slide prevention. In the preferred embodiment, the slide prevention membrane is made of Mirafi MPV400, manufactured by the Tencate company, located in Pendergrass, Ga. In other embodiments, additional fabricated seams with attachment points are added to the barrier 20 to further assist in slide prevention.

There are several methods of manufacturing the T-seam 65. The T-seam 65 can be welded using one of three types of machines: hot air welding, hot wedge welding, or radio frequency welding. There are many manufacturers of machines that can accomplish this weld, including Miller Weldmaster, which sells both hot air and hot wedge machines, and Kabar Manufacturing, which sells a radio frequency welding machine.

A conventional sewing method for making the T-seam 65 is illustrated in FIG. 17. First, in FIG. 17A, flexible reinforced plastic panels 402 and 403 are bonded together. Then, in FIG. 17B, flexible plastic panel 404 is placed on top of panels 402 and 403. In FIG. 17C, a double sewn line 405 of at least four lock stitches per inch connects panel 402 to panel 404. The thread used for this sewing process must be heat resistant up to 900 degrees. Although there are many thread manufacturers, the preferred one is Saunders Thread Company. In FIG. 17D, a panel 406 is welded onto the sewn area, which prevents external fluid leaks through the perforated areas. These steps of the process combine to create a three-sided connection, the T-seam 65. This conventional method of making the T-seam 65 is used to make barriers that are only four feet or less in height.

Figure 18A:
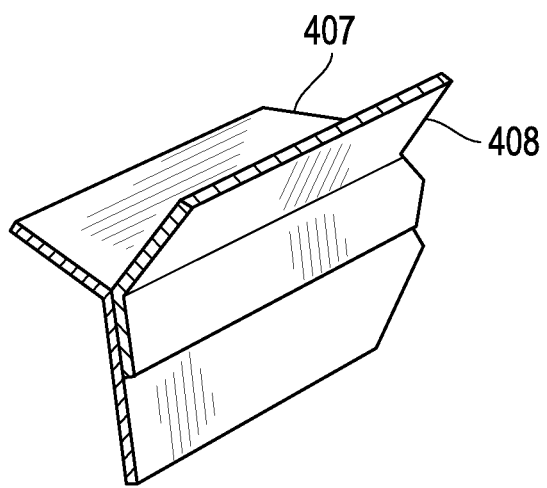
FIGS. 18A and 18B illustrate seam connections when manufacturing the barrier, using a hot air welder.
Figure 18B:
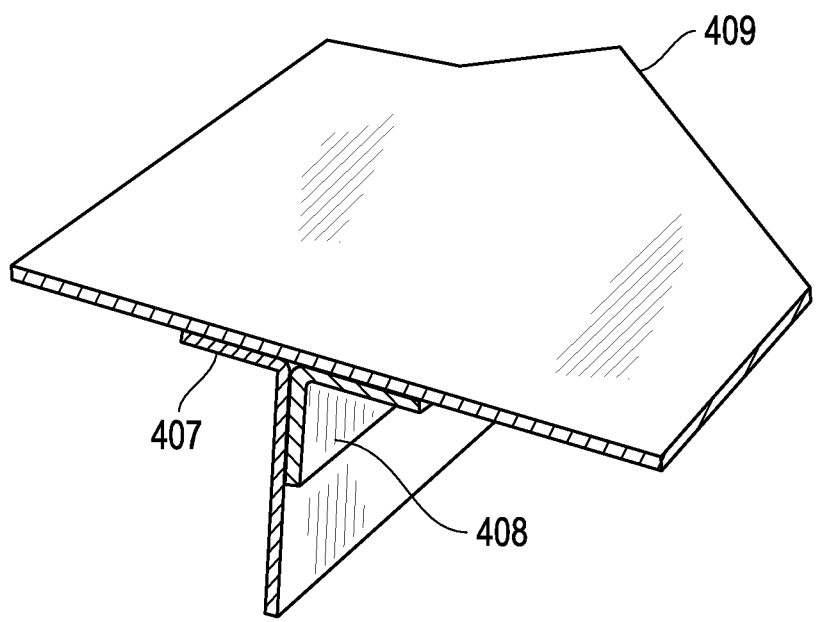

A method for making the T-seam 65 is illustrated in FIG. 18. In FIG. 18A, flexible reinforced plastic panels 407 and 408 are welded together, using a hot air welder. In FIG. 18B, a flexible reinforced plastic panel 409 is dielectrically welded to panels 407 and 408, creating a three-sided connection, the T-seam 65.

Figure 19A:
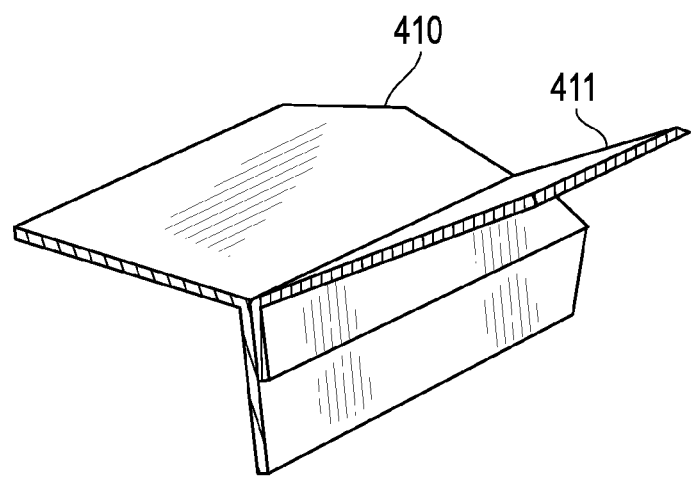
FIGS. 19A and 19B illustrate seam connections when manufacturing the barrier, using thermal welding.
Figure 19B:
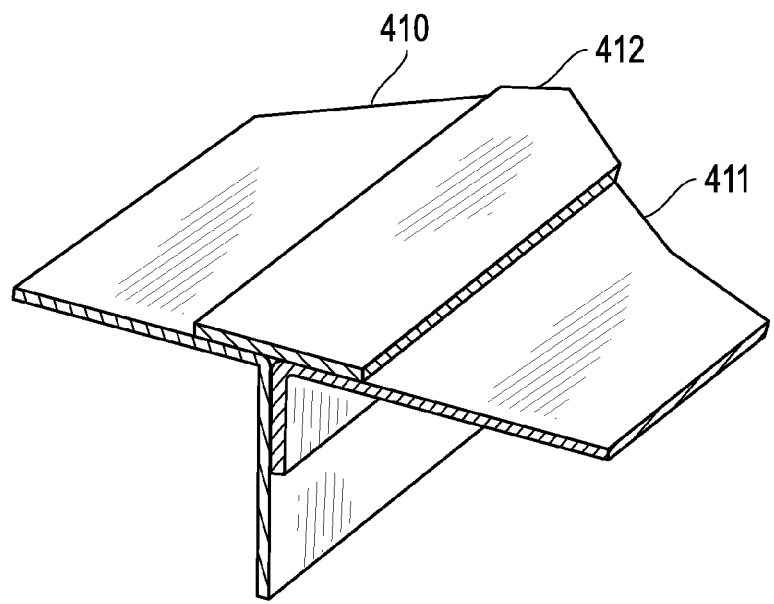

A second method is thermal welding. This method for making the T-seam 65 is illustrated in FIG. 19. In FIG. 19A, flexible reinforced plastic panels 410 and 411 are welded together. In FIG. 19B, a flexible reinforced plastic strip 412 is welded on top of the panels 410 and 411, creating a three-sided connection, the T-seam 65.

Figure 20A:
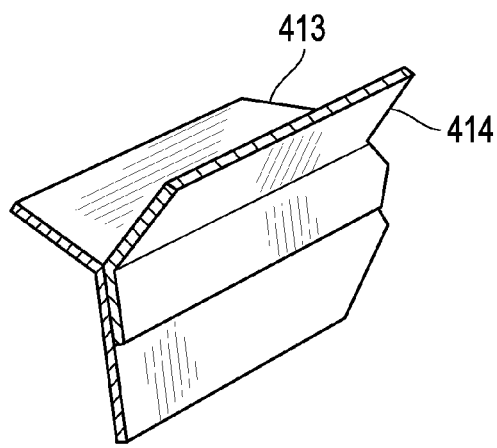
FIGS. 20A, 20B, and 20C illustrate seam connections when manufacturing the barrier, using a combination of sewing and thermally welding.
Figure 20B:
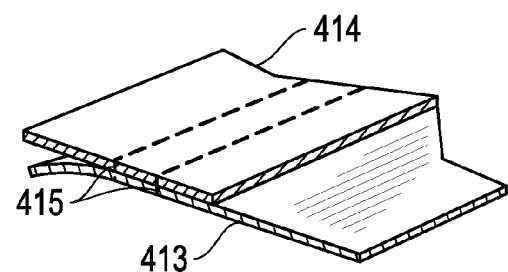
Figure 20C:
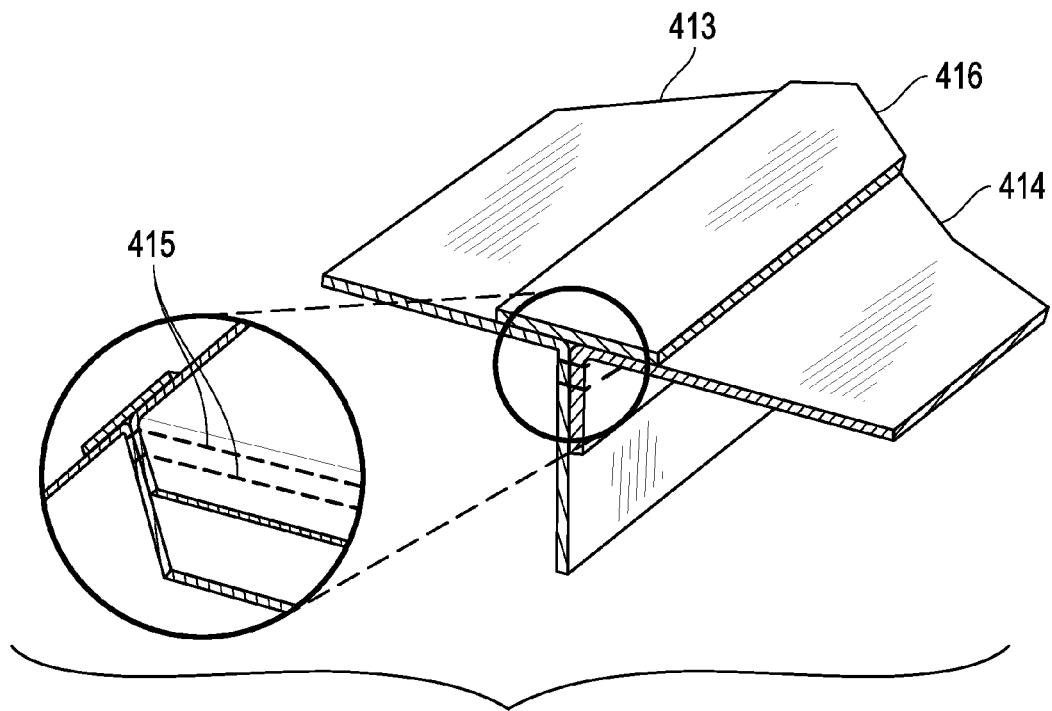

Referring now to FIG. 20, in the preferred embodiment, the T-seam 65 is produced by a combination of sewing and thermally welding. First, in FIG. 20A, flexible reinforced plastic panels 413 and 414 are thermally welded together. Next, in FIG. 20B, a double industrial sew line 415 is installed through the welded connection of panels 413 and 414. The sew line 415 is an additional safety measure in the event that the thermal welding process used to create the T-seam 65 is faulty. The thread used in this process does not need to be heat resistant because it is not being exposed to any of the welding processes. The preferred thread is a Kevlar filament thread, sold by the Saunders Thread Co., Model No. B-138 TEX 120 FIL, SK100 bonded NM, 16-ounce KT. It has a breaking strength of forty-five pounds.

The sew line is four lock stitches per inch, thus resulting in 180 pounds of breaking strength per inch. The maximum internal stress that an eight-foot-high barrier assembly 108, 216, 240, 266, or 300 receives is eighty-nine pounds. Thus, the sew line of four lock stitches per inch gives a safety factor of two. The sew line is installed within a quarter-inch or nearer to the outside edge of the longitudinal weld connecting panels 413 and 414. Next, in FIG. 20C, a flexible reinforced plastic panel 416 is welded on top of the panels 413 and 414. This is the preferred method for creating a three-sided connection, the T-seam 65.

A technical advantage of the invention is that it is simple and economical.

Another technical advantage is that, after locking, the invention provides a secure barrier 20 over a wide range of heights, from a few inches to the maximum filled height of the barrier.

Another technical advantage is that the invention is easily deployable and light weight. The barrier 20, when six feet high and one-hundred feet long, weighs only about 1,000 pounds when empty.

Another technical advantage is that the tension members 32, 132, and 136 lock the barrier 20 against continued rotation induced by unequal hydrostatic and/or hydrodynamic pressure applied against sides 124 or 128 (shown in FIG. 2) of the barrier, thus providing a secure barrier which does not require shoring up or bracing in order to prevent movement. Another technical advantage is that the tension members 32a and 133 provide a safety system, in case any of the tension members 32, 132, and 136 fail.

Another technical advantage, as shown in FIG. 3b, is that the wall 76 of the barrier 20 bulges prior to delamination of the lap seams, thereby providing a visual warning of overfilling.

Another technical advantage is that the bonding uses a double lap seam 50 which resists peeling, thus increasing the durability of the barrier.

Although an illustrative embodiment of the invention has been shown and described, other modifications, changes, and substitutions are intended in the foregoing disclosure. For example, the membrane 24 and/or the tension members 32, 32a, 132, 133, 136 may be fabricated from other materials, such as vinyl plastic, nylon-reinforced or polyester-reinforced neoprene rubber, polyethylene, polypropylene, butyl rubber, or other reinforced plastic or rubber. In addition, the opposite ends 33 or 34 of the barrier 20 may seal in differing manners, one end sealing according to one of the embodiments described above, and the other end according to another. Further, other connectors, such as mating "VELCRO" straps, D-rings, clamps, or a hand-crankable draw mechanism, may substitute for the buckles 230. Accordingly, it is appropriate that the appended claims be construed broadly and consistent with the scope of the invention.

What is claimed is:

1. A method of installing a fluid-fillable barrier into flowing water, the barrier comprising a tubular impermeable membrane having a longitudinal axis, first and second barrier ends at first and second ends of the longitudinal axis, a middle, fluid-fillable portion, a first attachment area on a first side of the longitudinal axis, and a second attachment area on a second side of the longitudinal axis, the second side opposing the first side; a first tension member extending from the first attachment area to the second attachment area, a second tension member extending from the first attachment area to the second attachment area, the tension members each having at least one hole to equalize fluid pressure on either side of the tension member, wherein the first tension member has a taut length which is less than one-half of the taut perimeter of a cross-section of the tubular membrane, the taut length and the taut perimeter being measured at a common cross-section taken perpendicular to a longitudinal axis of the tubular membrane, and wherein the length of the second tension member, in a relaxed state, is at least one inch longer than the taut length of the first tension member, the barrier further comprising a first lifting loop at the first barrier end, and a second lifting loop at the second barrier end, each loop sized to receive a two-inch pipe, and each loop having a plurality of cut-outs, the method comprising the steps of:

sliding a first pipe into the first lifting loop;
connecting a second pipe to the first pipe through at least two of the cut-outs;
connecting the second pipe to a first hoisting apparatus;
sliding a third pipe into the second lifting loop;
connecting a fourth pipe to the third pipe through at least two of the cut-outs;
connecting the fourth pipe to a shoreline anchor point;
using the hoisting apparatus to raise the first barrier end above the flowing water;
inflating the barrier with fluid; and
lowering the first barrier end into the flowing water.

2. The method of claim 1, wherein in the step of connecting the fourth pipe to a shoreline anchor point, the shoreline anchor point is replaced with a second hoisting apparatus, and wherein both the first hoisting apparatus and the second hoisting apparatus are used to lower the barrier into the flowing water.

\* \* \* \* \*